March 13, 1951 W. N. HARRELSON 2,544,955
REMOTE CONTROL FOR VEHICULAR COMBUSTION ENGINES
Filed Jan. 18, 1950 3 Sheets-Sheet 1
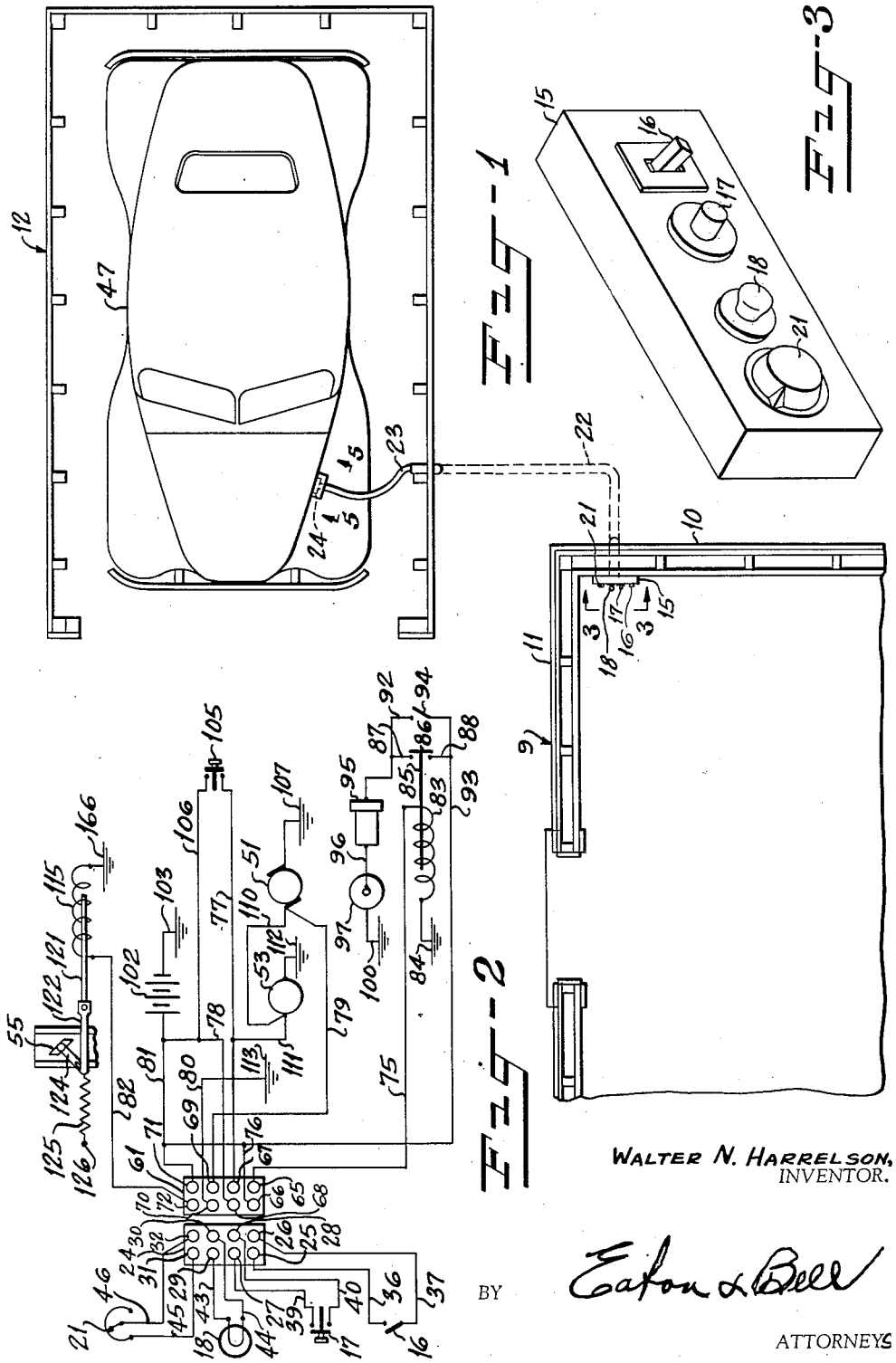
WALTER N. HARRELSON,
INVENTOR.
BY Eaton & Bell
ATTORNEYS March 13, 1951 W. N. HARRELSON 2,544,955
REMOTE CONTROL FOR VEHICULAR COMBUSTION ENGINES
Filed Jan. 18, 1950 3 Sheets-Sheet 2

INVENTOR:
WALTER N. HARRELSON.

BY Eaton & Bell
ATTORNEYS

March 13, 1951 W. N. HARRELSON 2,544,955
REMOTE CONTROL FOR VEHICULAR COMBUSTION ENGINES
Filed Jan. 18, 1950 3 Sheets—Sheet 3

INVENTOR:
WALTER N. HARRELSON

BY Eaton & Bell
ATTORNEYS

Patented Mar. 13, 1951

2,544,955

UNITED STATES PATENT OFFICE 2,544,955

REMOTE CONTROL FOR VEHICULAR COMBUSTION ENGINES

Walter N. Harrelson, Spartanburg, S. C.

Application January 18, 1950, Serial No. 139,316

3 Claims. (Cl. 290—37)

This invention relates to an improved means for starting and stopping an internal combustion engine of an automotive vehicle by remote control and it is the primary object of this invention to provide a control panel which may be disposed within one's home and having means for removably connecting the controls on the control panel to the engine of an automotive vehicle disposed outside of the home, say, in a garage, and by manipulation of the controls within the home, the engine of the automotive vehicle may be started and stopped at will.

This is a particularly advantageous apparatus since it is possible for a person within his home to start the engine of his automobile in advance of his actually using the vehicle to thus provide ample time for the engine to become heated to a normal operating temperature prior to the vehicle being used and, when the operator is about to use the vehicle, the removable means may be detached from the vehicle whereupon the conventional controls of the vehicle may be used in operating the same. It is well known that by starting the engine of an automobile in advance of its actually being used, and permitting the engine to idle for a predetermined length of time, the various working parts of the engine are heated gradually and this lends to economy of operation of the engine of the automotive vehicle.

Some of the objects of the invention having been stated, other objects will appear as the description proceeds when taken in connection with the accompanying drawings, in which—

Figure 1 is a schematic top plan view showing a portion of a home and a garage adjacent the home with an automotive vehicle in the garage and showing an electrical connection between the automotive vehicle and a control panel within the home;

Figure 2 is a wiring diagram showing the various electrical apparatus in association therewith schematically;

Figure 3 is an isometric view of a control panel and looking substantially along the line 3—3 in Figure 1;

Figure 4:
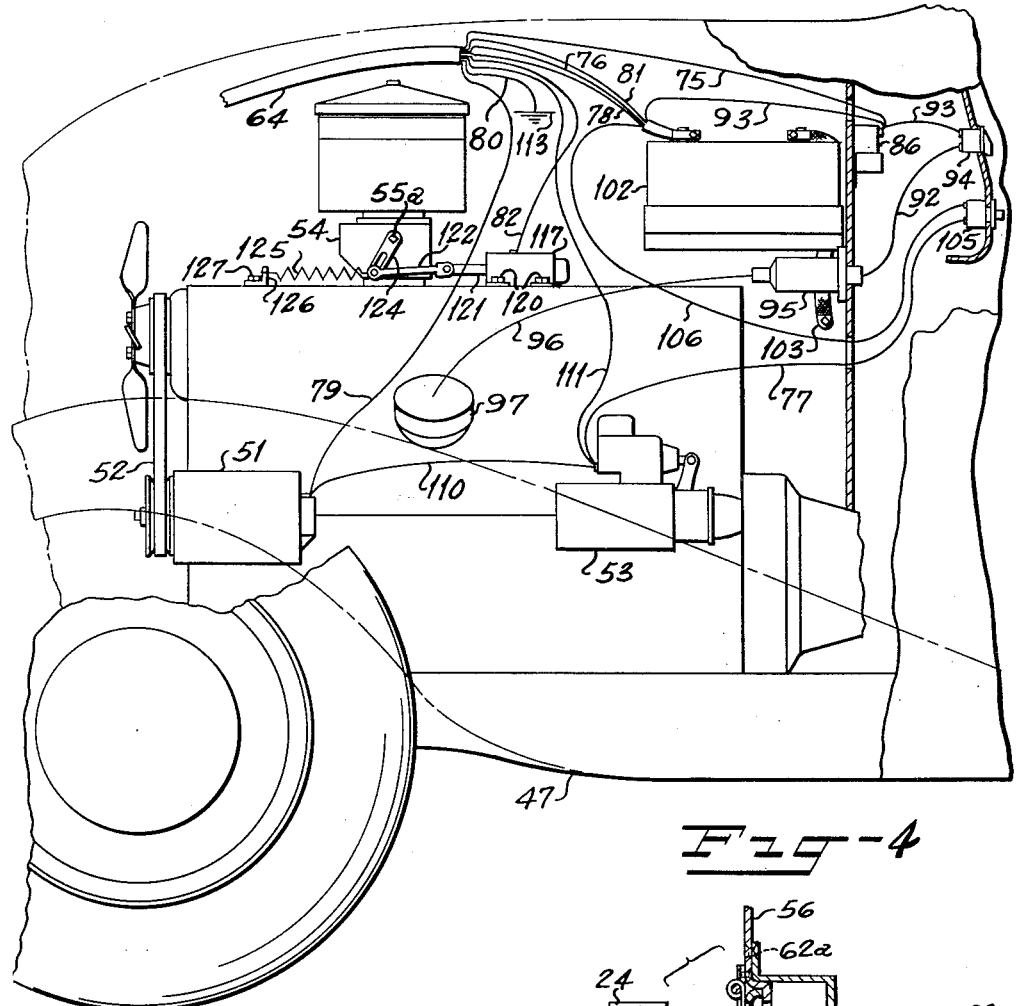
Figure 4 is a schematic elevation of the automotive vehicle looking substantially along the line 4—4 in Figure 1 but showing some parts broken away and some parts in phantom, and showing the manner in which the wires are connected to the various parts of the automotive vehicle.

Referring more specifically to the drawings, the numerals 10 and 11 indicate adjacent walls of a house 9 which are shown to be of frame construction but may be of any construction and a garage broadly designated at 12 is disposed adjacent the house.

A control panel 15 is suitably secured at any desired elevation on the inner surface of the wall 10 and has suitable controls thereon such as a toggle switch 16, a spring loaded pushbutton type starter switch 17, an indicating incandescent lamp 18 and a rheostat 21, the function of which will be later described. These controls on the control panel 15 have wires, to be later described, extending therefrom through a suitable weather-proof conduit 22 which extends through the wall 10 and preferably passes beneath the earth and then enters through the adjacent wall of the garage 12 at any desired elevation. This rigid conduit 22 has a flexible cable or conduit 23 extending therethrough in which the wires from the controls 16, 17, 18 and 21 are disposed. It will be noted that this flexible cable 23 extends a substantial distance out of the open end of the rigid conduit 22 and has a male connector 24 connected thereto. This male connector 24 has terminals from which electrodes extend, the terminals being indicated at 25 to 32 inclusive.

Referring to Figure 2, the toggle switch 16 has wires 36 and 37, connected to opposed sides thereof, which extend through the cable 23 and are connected to the terminals 25 and 26, respectively, on the male connector 24. The pushbutton starter switch 17 has wires 39 and 40 extending therefrom through the flexible cable 23 and being connected at their other ends to the terminals 27 and 28, respectively, on the male connector 24.

The incandescent lamp 18 has wires 43 and 44 extending therefrom through the cable 23 and being connected at their other ends to the terminals 29 and 30 on the male connector 24. The rheostat has wires 45 and 46 extending therefrom, through the cable 23, and being connected at their other ends to the terminals 31 and 32 on the male connector 24.

Now, referring to Figures 1 and 4, there is shown an automotive vehicle 47 parked within the garage 12 and which has an internal combustion engine 50 therein. The internal combustion engine 50 is of well known construction and only those parts pertinent to the present invention will be described. The engine 50 is provided with the usual generator 51 which is driven by the belt 52 upon operation of the engine 50 and the engine 50 also has a conventional starter motor 53 and a carburetor 54 for directing fuel to the engine. The carburetor 54 has a butterfly valve 55 (Figure 2) therein for operating the usual type of choker, the stem of the butterfly valve being indicated at 55a (Figure 4).

Figure 5:
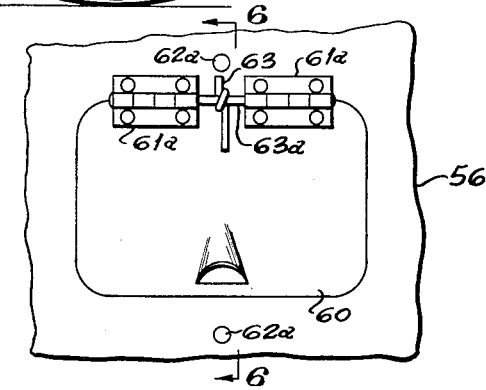
Figure 5 is an enlarged fragmentary elevation looking substantially along the line 5—5 in Figure 1 and illustrating a typical hinged cover plate for the female plug.
Figure 6:
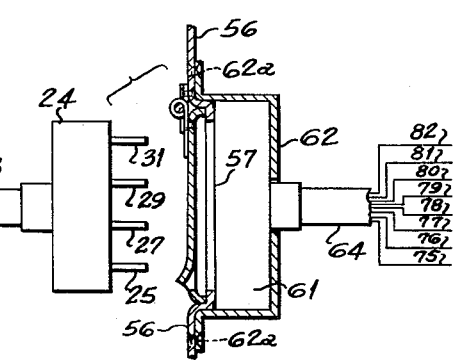
Figure 6 is an enlarged vertical sectional view taken substantially along the line 6—6 in Figure 5, but showing the male connector removed from the female connector for the electrical apparatus and showing a typical manner of mounting the female connector on the wall of the housing for the internal combustion engine.

A hood or engine housing 56 of the automotive vehicle 47 has an opening 57 therein (Figure 6) which is normally closed by a cover 60 hingedly connected, as at 61a to the hood 56 and which may be held in place over the opening 57 in any desired manner. In the present instance (Figure 5), the cover 60 is held in closed position over a female connector 61 by a torsion spring 63, the medial portion of which surrounds a hinge pin 63a at the upper edge of the cover 60. The female connector 61 is substantially larger than the opening 57 and also closes the opening 57 and is held against the inner surface of the engine housing 56 by a suitable strap iron member 62, which is, in turn, secured to the engine housing 56 as by rivets 62a.

A flexible conduit or cable 64 extends from the female connector 61 and loosely penetrates the strap iron bracket 62. This cable 64 has a plurality of wires therein, to be presently described, which extend from the various electrical parts associated with the internal combustion engine 50 and which are connected at their other ends to terminals 65 to 72, inclusive (Figure 2), which are adapted to engage the terminals 25 to 32, inclusive, respectively, when the male and female connectors 24 and 61 are assembled.

The terminals 65 to 72, inclusive, on the female connector 61 have respective wires 75 to 82, inclusive, connected thereto. The wire 75 from the terminal 65 is connected at its other end to one side of a solenoid relay coil 83, the other side of the relay coil 83 being grounded as at 84.

When the solenoid relay coil 83 is energized, in a manner to be later described, this urges a solenoid relay plunger 85 inwardly and closes a relay switch 86 to complete a circuit between wires 87 and 88 connected to opposed sides of the switch 86. The remote ends of the wires 87 and 88 are connected intermediate the ends of wires 92 and 93, respectively, which are connected to opposed sides of a conventional ignition switch 94.

The wire 92 extends from the ignition switch 94 and is connected at its other end to an ignition coil 95, which is a conventional part of the automotive vehicle, and from the other side of which a wire 96 extends to a conventional distributor 97 which is grounded as at 100. The structure of the distributor 97, which is the usual type of distributor associated with automotive vehicles, is well known, and a further description or illustration thereof is deemed unnecessary.

The wire 93 from the side of the ignition switch 94 remote from the wire 92 is connected at its other end intermediate the ends of the lead wire 81 extending from a storage battery 102 to the terminal 71. The storage battery 102 is also a conventional part of the automotive vehicle 47. The battery 102 is grounded as at 103 at its side remote from the lead wire 81.

The wire 76 from the terminal 66 is connected intermediate the ends of the wire 93. The wire 77 from the terminal 67 of the female plug 61 is connected at its other end to one side of a conventional push-button two point make starter switch 105, to the other side of which a wire 106 is connected, this wire 106 being connected at its end remote from the switch 105 intermediate the ends of the wire 78 from the terminal 68. The end of the wire 78 remote from the terminal 68 is connected intermediate the ends of the lead wire 81.

The wire 79 from the terminal 69 of the female plug 61 is connected at its other end to one side of the generator 51 the other side of which is grounded as at 107. Also connected to the side of the generator 51, to which the wire 97 is connected, is a wire 110 which is connected at its other end to one side of the conventional starter motor 53. A wire 111 is also connected to the same side of the starter motor 53 as that to which the wire 110 is connected, and the end of the wire 111 remote from the starter motor 53 is connected intermediate the ends of the wire 77. The starter motor 53 is grounded as at 112. The wire 80 from the terminal 70 of the female plug 61 is grounded at its free end as at 113.

The wire 82 from the terminal 72 of the female plug 61 is connected at its other end to one side of a solenoid coil 115 which is grounded at the other side thereof as at 116. The solenoid coil 115 is disposed in a housing 117, in Figure 4, which is a part of the present invention and is secured as by screws 120 to the engine 50. The solenoid coil 115 surrounds a solenoid plunger 121 to which one end of a link 122 is pivotally connected, the other end of the link 122 being pivotally connected to an arm 124 secured to the stem 55a of the butterfly valve 55.

A suitable spring such as the spring 125 may be connected at one end to link 122 and at its other end to a spring perch 126 secured as by screws 127 to the engine 50. The spring 125 normally urges the solenoid plunger 121 outwardly to hold the butterfly valve 55 in open position.

The length of the plunger 121 will determine how much the valve 55 is moved, to cause it to be moved only to starting position.

Figure 7:
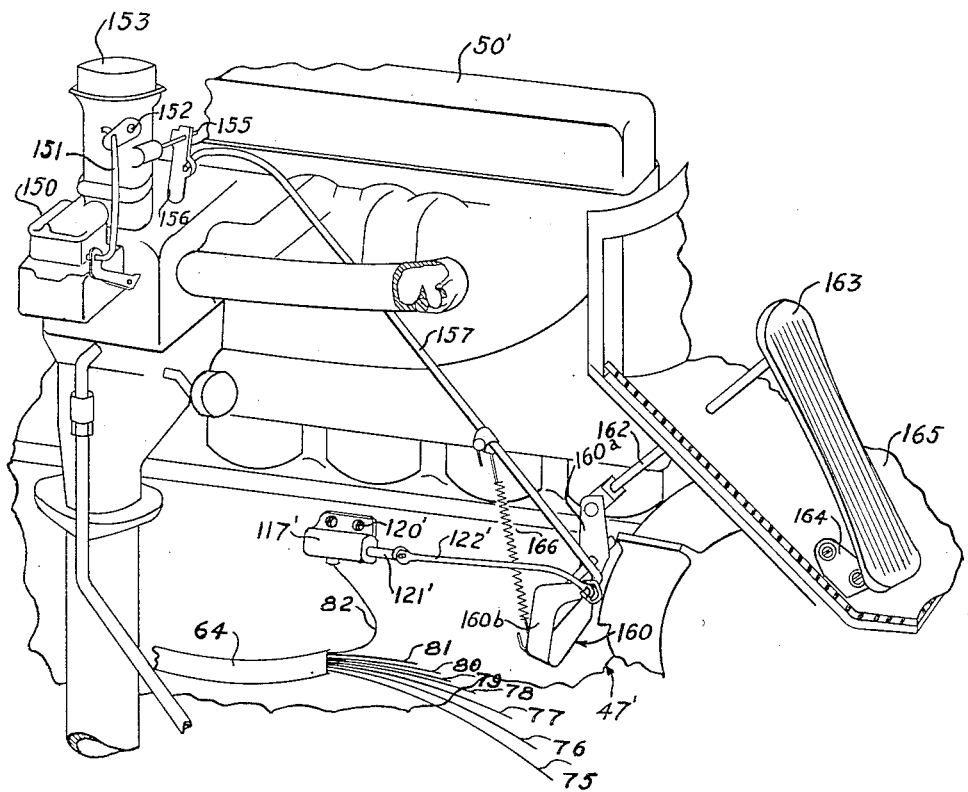
Figure 7 is a schematic elevation of an automotive vehicle similar to Figure 4 but showing a modified form of the invention.

If the automotive vehicle with which it is desired to use the present invention is equipped with an automatic choker, then the solenoid plunger 121 and associated parts may be connected to the accelerator linkage so that movement of the solenoid plunger 121 will cause corresponding movement of the accelerator linkage to automatically open or close the choker. Referring to Figure 7, there will be observed a modified form of the invention associated with an automotive vehicle equipped with an automatic choker and in which like parts will bear like reference characters with the prime notation added. In this illustration, the automotive vehicle 47' is provided with an engine 50' provided with an automatic choke control unit 150 connected by a link 151 to a choke valve, not shown, having a stem 152. The choke valve is disposed within an air intake 153. The conventional automatic choke control unit is thermostatically controlled. A throttle valve, not shown, having a stem 155, is also disposed in the air intake 153. An arm 156 is fixedly secured to the stem 155 of the throttle valve and pivotally connected to this arm 156 is a rod 157 which extends downwardly and has the other end thereof pivotally connected to a substantially U-shaped bracket 160 which is pivotally connected in the engine housing and has upwardly extending arms 160a and 160b. The arm 160a has pivotally secured thereto one end of a rod 162 connected to an accelerator pedal 163 hingedly mounted as at 164 on the floor 165 of the automotive vehicle.

It will thus be seen that by moving the accelerator pedal 163 toward the floor, the shaft 162 will move downwardly to move the arm 160a of the bracket 160 in a counter-clockwise direction to thus urge the rod 157 upwardly to rotate the stem 155 of the throttle valve for adjusting the same. Now, in this form of the invention, the solenoid switch housing 117' is mounted on the engine housing as by bolts 120' and the solenoid 117' has a coil, not shown, like the coil 115 and a solenoid plunger 121' which is pivotally connected at its free end to a link 122' which is pivotally connected to the arm 160b of the bracket 160, the rod 157 preferably extending through a slot in the arm 160b and having the rod 122' pivotally mounted thereon. A spring 166 normally urges the arm 160b of the bracket 160 in a clockwise direction. The solenoid 117' is connected in the electric circuit in the same manner as the solenoid 117 heretofore described and is used in a like manner except that it operates the throttle valve instead of the choker.

Thus, by actuating the rheostat 21, heretofore described, the solenoid plunger 121' in the modified form of the invention will be caused to move inwardly to thus move the link 122' to the left in Figure 7 to pivot the bracket 160 in a counter-clockwise direction to move the throttle valve in the air intake 153 to assist in starting the vehicle.

*Method of operation*

Normally, the flexible cable 23 (Figures 1 and 5) depends from the rigid conduit 22 and, upon an operator driving the vehicle 47 into the garage 12, he may then open the cover 60 (Figure 5) on the engine housing 56 so as to expose the female connector 61. The male connector 24 is then connected to the female connector 61 and the internal combustion engine 50 of the automotive vehicle 47 may then be started at any desired time from within the house 9.

When the operator desires to start the engine 50 while within the house 9, he may close the toggle switch 16 which will cause current to flow from the battery 102 through the wires 81, 93, and 76, through the terminals 66 and 26 and the wire 37 to one side of the switch 16. The current then flows through the switch 16, through the wire 36, terminals 25 and 65, and the wire 75 through the solenoid relay coil 83 which is grounded at 84 to thus energize the coil 83.

This will cause the relay switch 86 to close to thus complete a circuit between the wires 87 and 88, the current then flowing from the battery 102 through the wires 81, 93, 88, switch 86, wires 87 and 92 through the coil 95 and the wire 96 to the distributor 97 which is grounded at 100. This will then complete a circuit to the distributor.

The remote control starter button 17 may then be depressed to close the switch 17 and this will complete a circuit from the storage battery 102 through the wires 81 and 78, the terminals 68 and 28, the wire 40, the switch 17, the wire 39, terminals 27 and 67, through the wires 77 and 111 to the starter motor 53 which is grounded at 112 to thus start the engine 50.

Now, in order to further assist in starting the engine 50, the rheostat 21 is provided which, by adjustment thereof, will control the flow of electrical energy to the solenoid coil 115, the current then flowing from the battery 102 through the wire 81, terminals 71 and 31, the wire 45, the rheostat 21, the wire 46, terminals 32 and 72 and wire 82 to the solenoid coil 115, which is grounded at the other side thereof at 116. This will, of course, cause the solenoid plunger 121 to move toward the solenoid coil 115 to thus close the butterfly valve 55 of the choker to thus assist in introducing the fuel to the engine 50.

In order that the operator may know when the engine has actually started, the indicating incandescent bulb 18 is provided on the control panel 15. When the engine has started, the generator will be energized to cause current to flow from the generator 51 through the wire 79, terminals 69 and 29, the wire 43 to the incandescent lamp 18. The circuit will then be completed through the incandescent lamp 18, the wire 44, the terminals 30 and 70 and the wire 80 to the ground 113.

It is thus seen that I have provided an improved apparatus for starting an engine of an automotive vehicle at a point substantially remote from the automotive vehicle and which will be of great advantage during cold weather when the resident of the house does not desire to spend a considerable length of time in his automotive vehicle waiting for the engine 50 to become heated to a proper operating temperature.

It is evident that there are many different ways in which the various electrical components may be arranged and the circuits therefore may be altered or combined in a manner different from that shown in the drawings without departing from the spirit of the invention, the circuit shown in the accompanying drawings constituting only the preferred form of the invention.

It is thus seen that I have not only provided a means for remotely controlling the starting and stopping of the engine 50 of the automotive vehicle 47 but I have also provided means for indicating when the engine is operating. It is evident from the arrangement of the various conductors shown in Figure 2 that the engine may be controlled in a conventional manner for starting and stopping the same whether or not the connectors 24 and 61 are in assembled position. In fact, it is not necessary to change the original wiring in the automotive vehicle, it merely being necessary to add the various features of this invention to the wiring of the automotive vehicle in its original form and the only device which should be mounted on the vehicle other than the electrical wiring and the connector 61 is the solenoid housing 117 and the means connecting the same to the choker.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In an automotive vehicle having an internal combustion engine and having a choker, and also having a storage battery and being provided with a generator and a starter motor, said automotive vehicle also having an ignition system associated with the internal combustion engine, an electrical connector adapted to be secured to the automotive vehicle, a plurality of wires extending from the storage battery, the generator, and the starter motor to said electrical connector, a solenoid operated means for controlling the choker, a wire from the solenoid operated means for controlling the choker to said connector, a mating connector removably connectable to the first-named connector, a plurality of wires extending from the mating connector to a point substantially remote from the automotive vehicle, a control panel, a plurality of switches and visual indicating means on said control panel, said wires from the mating connector being connected to the corresponding switches and indicating means on said control panel whereby upon moving one of said switches on the control panel, a circuit may be completed to the ignition of said engine and upon closing a second one of the switches on said control panel, a circuit may be completed to the starter motor associated with the internal combustion engine and upon manipulation of a third one of said switches on said control panel, a circuit may be completed to the solenoid operated means for controlling the choker, a connection between the generator and the indicating means on said control panel when the mating connector is connected to the first-named connector whereby, upon the engine being started, current will flow from the generator to the indicating means to energize the indicating means to indicate that the motor has started and whereby upon the engine being started, the mating connector may be disconnected from the first-named connector to thus permit movement of the automotive vehicle from one place to another and to permit the mating connector to remain in substantially the same position in which it had previously been disposed.

2. An automotive vehicle having an internal combustion engine and having an air intake for the same and a valve in the air intake and also having a storage battery and being provided with a generator and a starter motor, said automotive vehicle also having an ignition system associated with the internal combustion engine, an electrical connector adapted to be secured to the automotive vehicle, a plurality of wires extending from the storage battery, the generator and the starter motor to said electrical connector, a solenoid operated means for controlling the valve in the air intake, a wire from the solenoid operated means for controlling said valve extending to said connector, a mating connector removably connectable to the first-named connector, a plurality of wires extending from the mating connector to a point substantially remote from the automotive vehicle, a control panel, a plurality of switches and visual indicating means on said control panel, said wires from the mating connector being connected to the corresponding switches and indicating means on said control panel whereby, upon moving one of said switches on the control panel, the circuit may be completed to the ignition of said engine and upon closing a second one of the switches on said control panel, a circuit may be completed to the starter motor associated with the internal combustion engine and upon manipulation of a third one of said switches on said control panel, a circuit may be completed to the solenoid operated means for controlling the valve in the air intake, a connection between the generator and the indicating means on said control panel when the mating connector is connected to the first-named connector whereby upon the engine being started, current will flow from the generator to the indicating means to energize the indicating means to indicate that the motor has started and whereby upon the engine being started, the mating connector may be disconnected from the first-named connector to thus permit movement of the automotive vehicle from one place to another and to permit the mating connector to remain in substantially the same position in which is had previously been disposed.

3. In an automotive vehicle having an internal combustion engine and having an air intake for the same with a throttle valve disposed therein, and also having a storage battery and being provided with a generator and a starter motor, said automotive vehicle also having an ignition system associated with the internal combustion engine, an electrical connector adapted to be secured to the automotive vehicle, a plurality of wires extending from the storage battery, the generator and the starter motor to said electrical connector, a solenoid operated means for controlling the throttle valve, a wire from the solenoid operated means for controlling the throttle valve to said connector, a mating connector removably connectable to the first-named connector, a plurality of wires extending from the mating connector to a point substantially remote from the automotive vehicle, a control panel, a plurality of switches and visual indicating means on said control panel, said wires from the mating connector being connected to the corresponding switches and indicating means on said control panel whereby upon moving one of said switches on the control panel, a circuit may be completed to the ignition of said engine and upon closing a second one of said switches on said control panel, a circuit may be completed to the starter motor associated with the internal combustion engine and upon manipulation of a third one of said switches on said control panel, a circuit may be completed to the solenoid operated means for controlling the throttle valve, a connection between the generator and the indicating means on said control panel when the mating connector is connected to the first-named connector whereby, upon the engine being started, current will flow from the generator to the indicating means to energize the indicating means to indicate that the motor has started and whereby upon the engine being started, the mating connector may be disconnected from the first-named connector to thus permit movement of the automotive vehicle from one place to another and to permit the mating connector to remain in substantially the same position in which it had previously been disposed.

WALTER N. HARRELSON.

REFERENCES CITED

The following references are of record in the file of this patent:

UNITED STATES PATENTS

| Number | Name | Date |
|---|---|---|
| 1,150,032 | Heins | Aug. 17, 1915 |
| 1,459,726 | Goodheim | June 26, 1923 |
| 1,565,854 | Hasselbring, Jr. | Dec. 15, 1925 |
| 1,591,037 | Hasselbring, Jr. | July 6, 1926 |
| 1,776,683 | Larkin | Sept. 23, 1930 |
| 2,098,549 | Luke | Nov. 9, 1937 |
| 2,423,464 | Moncrief | July 8, 1947 |

OTHER REFERENCES

Popular Mechanics, June, 1915, page 831.